United States Patent [19]

Kendrick et al.

[11] Patent Number: 5,096,171

[45] Date of Patent: Mar. 17, 1992

[54] LAWN MOWER SERVICE ASSEMBLY

[76] Inventors: Johnny K. Kendrick, Rte. 2, Box 62, Bassett, Va. 24055; Tony L. Adkins, Rte. 3, Box 41, Chatham, Va. 24531

[21] Appl. No.: 711,952

[22] Filed: Jun. 7, 1991

[51] Int. Cl.⁵ .............................................. B23Q 3/00
[52] U.S. Cl. ......................................... 269/15; 269/79; 254/88
[58] Field of Search ........................... 269/15, 296, 79; 254/88, 89 R, 90; 184/1.5, 106; 141/340

[56] References Cited

U.S. PATENT DOCUMENTS

| | | | |
|---|---|---|---|
| 1,415,968 | 5/1922 | Wilson | 269/15 |
| 2,985,448 | 5/1961 | Hancock | 269/15 |
| 4,022,257 | 5/1977 | O'Connell | |
| 4,031,939 | 6/1977 | De Martini | 254/88 |
| 4,054,184 | 10/1977 | Marcinko | |
| 4,195,710 | 4/1980 | Garrison | |
| 4,819,910 | 4/1989 | Johnston | 254/88 |

FOREIGN PATENT DOCUMENTS 315139  10/1919  Fed. Rep. of Germany ........ 269/15

*Primary Examiner*—Robert C. Watson
*Attorney, Agent, or Firm*—Olive & Olive

[57] ABSTRACT

A lawn mower service assembly includes a rectangular platform having a central recess froming a pit for receiving an oil collecting tank and on opposites sides of the pit holding the oil collecting tank a support surface or stand for supporting either a walk-behind type mower or a tilted mower such that the engine oil from either can be drained and collected in the tank.

7 Claims, 3 Drawing Sheets

LAWN MOWER SERVICE ASSEMBLY

FIELD OF THE INVENTION

This invention relates to the field of servicing of small engines, and more particularly to the servicing of gasoline powered lawn mowers.

BACKGROUND OF THE PRIOR ART

The gasoline powered lawn mower is a popular machine for both homeowner and professional use. It comes in two basic styles, the walk-behind mower and the riding mower. The choice of style depends upon the size of the lawn to be mowed, the budget of the user and whether intended for homeowner or professional use. An intermediate style choice is between a power driven walk-behind and a push-type walk-behind. Riding mowers are also available in front engine mount and rear engine mount styles.

All of the described mowers are arranged with a main body, four wheels and a gasoline engine. The cutting blade is generally mounted beneath the body and driven with the power output shaft of the engine.

As with all gasoline engines, it is necessary to periodically perform service operations on the lawn mower engine. Basic to this service is the changing of the engine oil which becomes dirty as the engine is used. Due to the dirt accumulated and to the heat which is generated by the engine, the lubricating properties of the oil deteriorate and the major engine parts may become subject to excessive wear. Failure to change the oil in a reasonable time could result in engine damage and costly repairs.

When one takes an automobile to a service station to have servicing done, particularly changing of the oil, it is generally done with the car placed over an oil collecting receptacle. This may be accomplished by raising the car on a lift or by having the oil collector in a pit which is lower than the car.

In the case of a walk-behind lawn mower engine, the draining of oil and other service functions are generally done by turning the mower upside down or holding it in an inclined position with one hand while attempting to work with the other hand. Since the oil drain plug is typically located under the mower, this is a difficult procedure.

In the case of a riding mower with a front mounted engine the oil drain plug is usually placed at the lower rear of the engine. One can drain the oil without changing the position of the mower, but this results in the oil flowing over the lower rear portions of the mower and making an unnecessary clean up job. It is also more difficult to collect the oil if it is drained in this manner, meaning it will either drain into the earth and cause environmental damage or onto a driveway and cause more cleaning chores. In the case of a rear mounted riding mower engine the engine and mower are typically serviced by tipping the entire mower ninety degrees and supporting the mower on a pair of support brackets typically mounted on the rear of the mower. The oil drain plug at the rear of the engine for a riding mower with a rear mount engine thus becomes readily accessible.

These problems are real for the individual owner of a lawn mower, but they are magnified significantly when taken in the context of the lawn mower service and repair shops. These shops do operations as described above on mowers many times a day and have much greater quantities of oil to handle. In addition, service often includes the sharpening of the blade, tightening of drive belts and general cleaning, which operations, whether done by an owner or a professional, require easy access to the bottom of the machine.

Keeping the description above in mind, it is an objective of the present invention to provide a servicing assembly which will enable the safe and easy repair to the underside of a lawn mower.

It is another objective of the present invention to provide a servicing assembly that simplifies the simple collection and control of the oil being drained from a mower.

It is a further objective of the present invention to provide a servicing assembly that is useful with both walk-behind and riding mowers.

These and additional objectives will become apparent as the disclosure below is discussed.

SUMMARY OF THE INVENTION

The invention disclosed provides a servicing assembly for lawn mowers which simplifies and makes more safe the operations of servicing the mower engines and other parts of walk-behind and riding mowers and particular of the rear engine mount type. The assembly includes a structurally reinforced platform having a pair of support surfaces or stands which can be positioned to accommodate the wheels of a walk-behind mower or the support brackets of a rear engine mount rider mower so as to support the mower safely. The servicing assembly further includes a relatively shallow oil collecting tank designed to sit on the platform in a recess formed as a pit between its support stands so as to collect oil drained from the mower being serviced. The servicing assembly further includes a lift rod adapted to hold a walk-behind mower in an upright position, thus freeing the hands of the mechanic for other tasks. The platform also has an integral entrance ramp to allow easy mounting of the mower.

While primarily intended for use with riding mowers having a rear engine mount, the servicing assembly may also be used in a suitable location below a riding mower having a front mounted engine to collect oil therefrom.

DESCRIPTION OF THE PREFERRED EMBODIMENT

The invention disclosed embodies a servicing assembly having a platform with a removable oil tank for improving the ease and safety of performing service operations on either a walk-behind or a rider lawn mower, particularly of the rear engine mount type, while simultaneously decreasing the environmental danger of accidentally spilled oil. The servicing assembly is adaptable for use with both types of mowers and is useful to the homeowner as well as to the professional service shop. As later explained, a walk-behind mower may be supported on the platform in a tilted or partially upright position by means of an elongated rod member pivotally secured to the platform and a rear mount engine type riding mower may be supported on its brackets on the platform.

Figure 1:
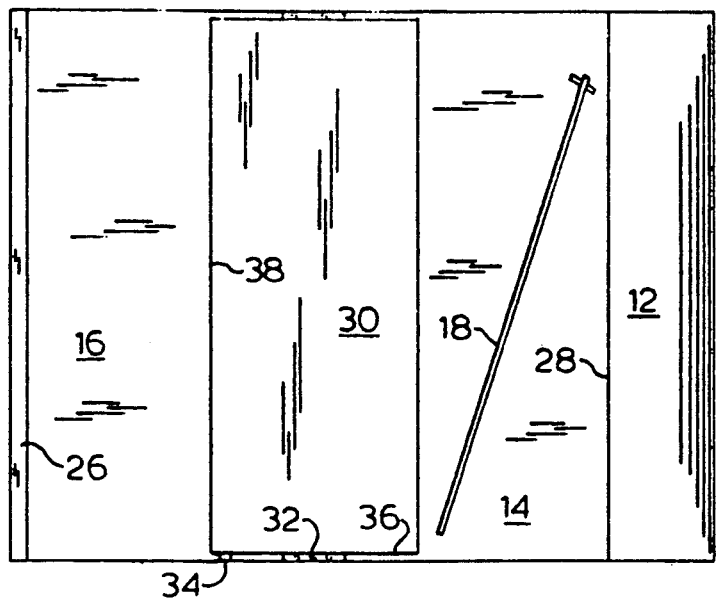
FIG. 1 is a top plan view of the servicing assembly forming a component of the servicing assembly of the invention with its mating oil tank removed for purpose of illustration.
Figure 2:
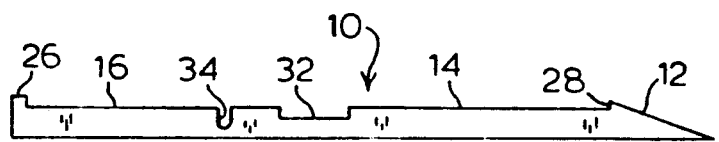
FIG. 2 is a side elevation view of the servicing assembly of the invention and with the oil collecting tank removed.

FIGS. 1 and 2 show, respectively, plan and elevation views of the platform component 10 of the invention assembly with common numerical identification of the various component parts. The rectangular shaped platform 10 is composed of four main sections, namely, an entry ramp 12, a first stand 14, a tank pit 30, and a second stand 16. First stand 14 and second stand 16 are in the same horizontal plane and are laterally spaced apart a distance sufficient to support the wheels of a walk-behind lawn mower (shown in FIG. 3) and are at a height so that the volume in tank pit 30 therebetween is adequate for receiving an oil tank to contain a reasonable quantity of oil, i.e. approximately five (5) quarts. Ramp 12 is situated on one side of first stand 14 and is sloped at an angle to the horizontal of about 20°. Ramp 12 terminates at a height slightly greater than the height of first stand 14 to form a vertical surface or stop 28. At the far side of second stand 16 there is a similar stop 26 creating, together with stop 28, a trapping pair of stops or barriers on the extreme outer side boundaries of stands 14, 16 so that the lawn mower WL to be mounted thereon will not accidentally roll off either end of platform 10.

Figure 8:
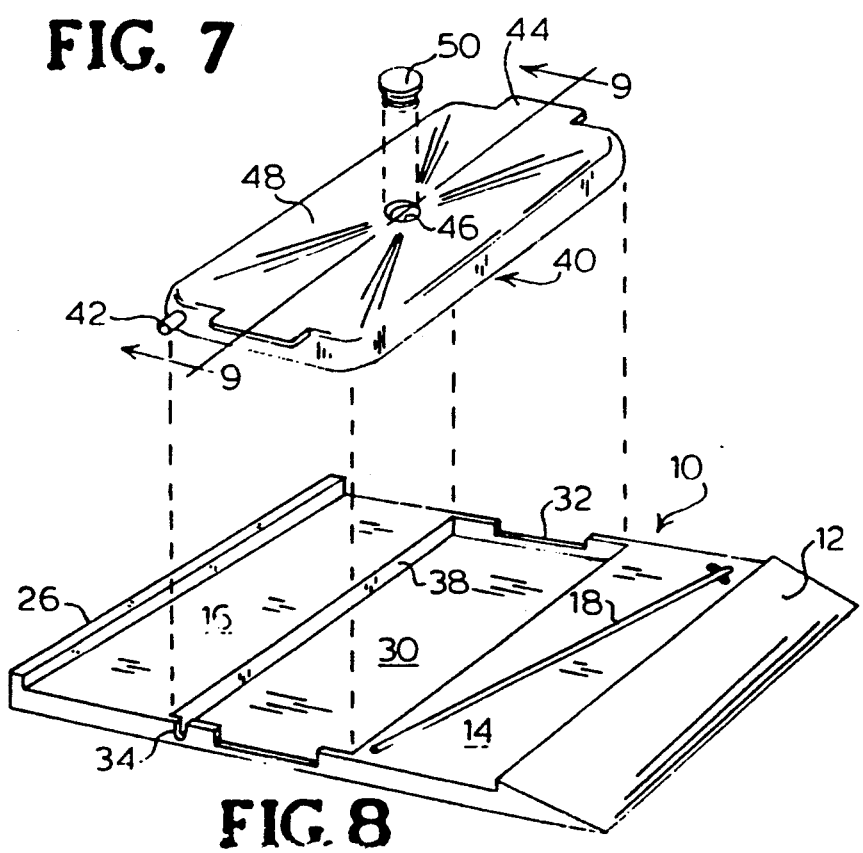
FIG. 8 is an exploded perspective view of the servicing assembly of the invention showing the oil collecting tank removed from its working position.

The recess between first and second stands 14, 16 forms a rectangular tank pit 30 dimensioned to loosely receive the oil tank 40 (see FIG. 8). Tank pit 30 has a horizontal rectangular bottom wall, two vertical side walls 38 and two vertical end walls 36. Side walls 38 also form the respective inner sides of stands 14, 16. End walls 36 connect stands 14, 16 and each is formed with a handle notch 32 and at least one of said end walls 36 has a drain plug notch 34 to receive the drain plug pipe 42 when oil tank 40 is placed in tank pit 30. Typical dimensions for stands 14, 16 are 28 inches long × 10 inches wide × 2 inches high above ground level. Tank pit 30 is dimensioned as previously stated to loosely receive the oil tank 40. A petroleum resistant plastic material, such as polyethylene or polypropylene is a desirable material to use for molding both platform 10 as well as oil tank 40 in view of possible contact with both oil and gasoline products.

Figure 3:
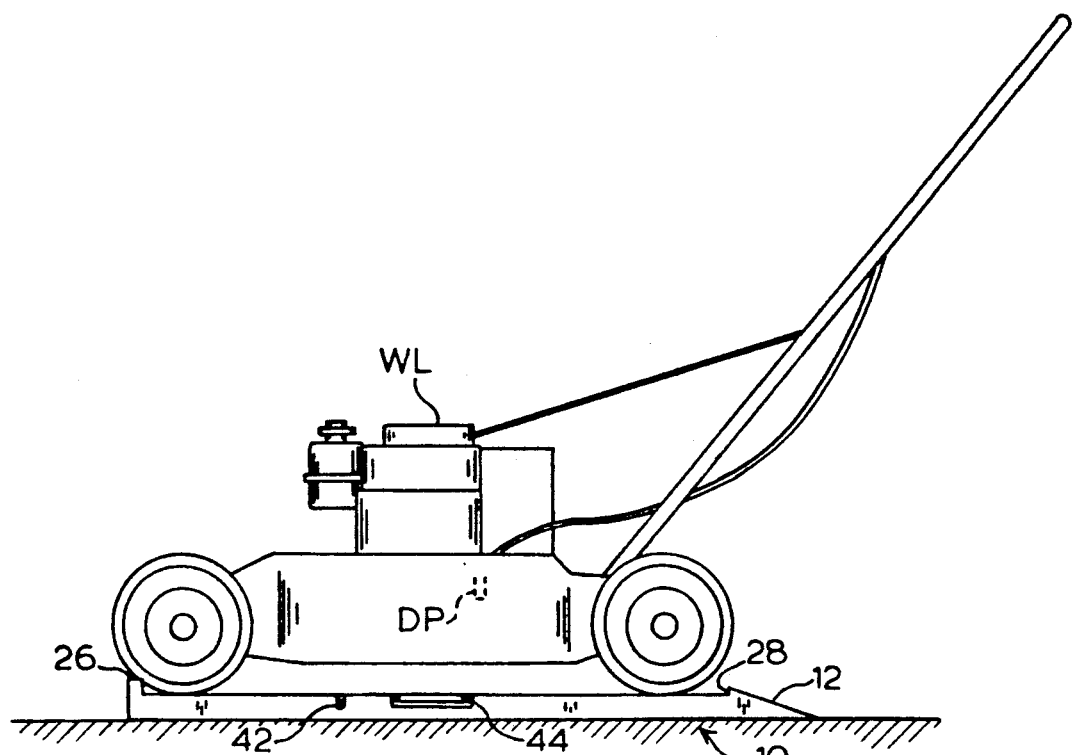
FIG. 3 is a side elevation view of the servicing assembly of the invention with a walk-behind lawn mower mounted on the ground or floor supported service platform and in position to begin work on upper portions of the mower and with the oil collecting pan installed ready for use.

In FIG. 3, the platform 10 of the invention is shown with a walk-behind lawn mower WL placed upon it. When lawn mower WL is positioned on platform 10 for service as in FIG. 3, two wheels rest on first stand 14 and the other two rest on second stand 16, with stop 28 and stop 26 acting to keep the lawn mower from accidentally rolling off. At a position somewhat off center of the bottom of lawn mower WL is oil drain plug DP shown in dotted lines. Drain plug DP must be accessed and removed in order to drain the dirty oil from the engine. In order to get at plug DP to remove it, one must lift at least one end of lawn mower WL. So as to safely hold mower WL up and free the hands of the mechanic for other work, a lift rod 18 is provided which is pivotally attached to stand 14 with a suitable hinge or the like enabling lift rod 18 to be easily moved into a position just beyond vertical to hold the mower securely. A large number of commercially available walk-behind lawn mowers are built with a construction similar to the illustrated walk-behind lawn mower WL and thus will be adaptable to the platform of the invention.

A variation in use of the illustrated platform 10 is to orient the ramp 12 90° from the position shown such that the left wheels of the mower WL will rest on stand 14, for example, and its right wheels will rest on stand 16.

Figure 4:
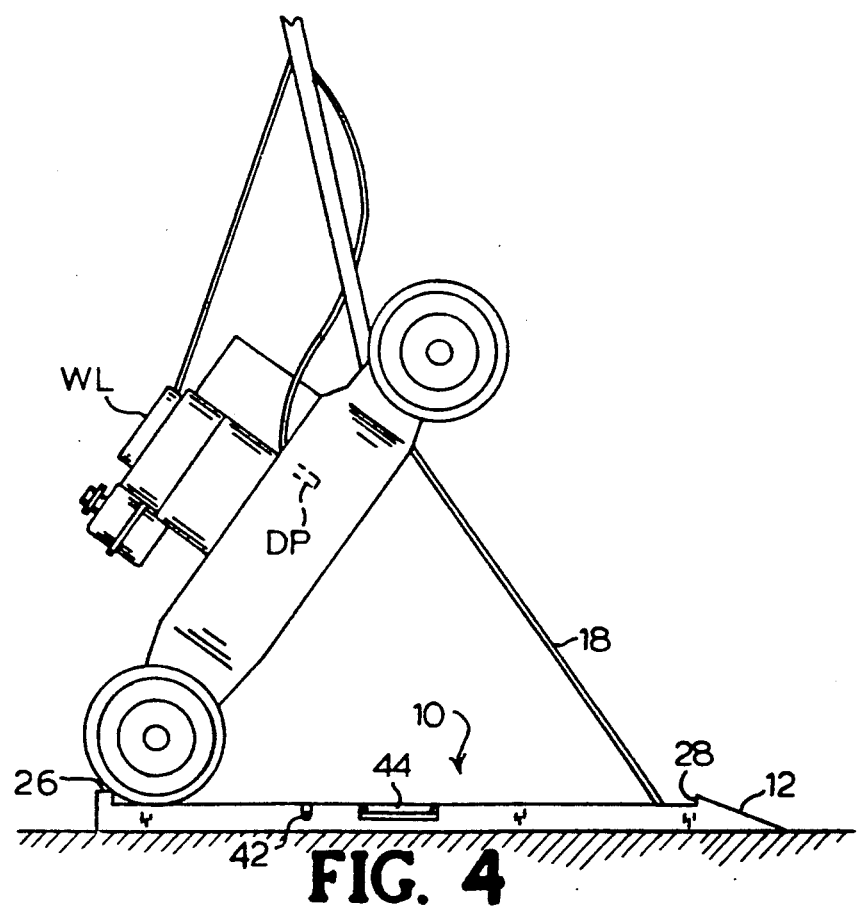
FIG. 4 is a side elevation view of the servicing assembly of the invention supported on a relatively level ground or floor surface with the walk-behind lawn mower of FIG. 3 being held up by a lift rod to obtain access to the bottom preparatory to servicing the underside of the mower and draining its oil.

Turning now to FIG. 4, the lift rod 28 is seen supporting mower WL in a position to enable the mechanic to use both hands to work on the drain plug, the blade or to clean the bottom surface of the body of the mower. The angle of lift rod 28 to platform 14 is selected so as allow lift rod 28 to hold mower WL without a locking mechanism.

Figure 5:
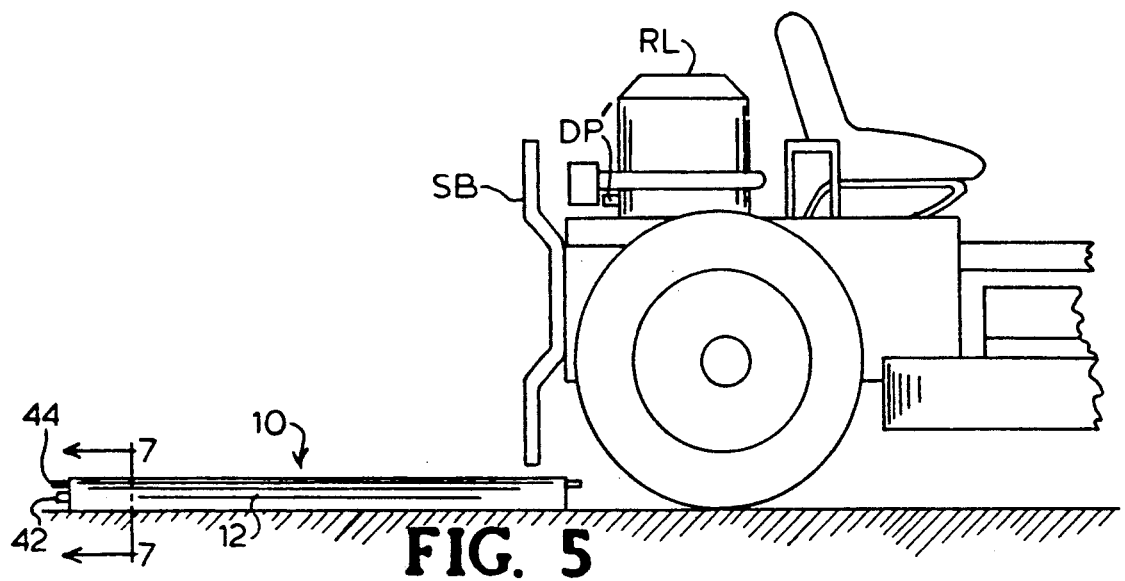
FIG. 5 is a side elevation view of the servicing assembly of the invention rotated ninety degrees with respect to its position on FIG. 4 and showing the rear portion of a rear engine mount type rider mower positioned adjacent the service platform.

An alternate use for the service platform 10 of the invention is for the service work on rear engine mount type riding mowers of which mower RL in FIG. 5 is an example. Rear engine mount riding mowers are generally serviced in an upright position for reasons indicated above and to access the blade as well. To support and balance a rear engine mount type riding lawn mower such as illustrative mower RL the mower is typically equipped with a pair of laterally spaced support brackets SB on the rear surface of the mower and assume a vertical position when the mower RL is in its operating position. The drain plug DP' is located at the rear lower part of the engine and is accessible from the rear. However, as was described above and as will be apparent from the position of riding mower RL in FIG. 5, the oil being drained will spill over the rear of the mower body and be difficult to control or to collect if drained in such position. In addition, service of the blades and the underbody will be difficult unless the mower is lifted or titled.

Figure 6:
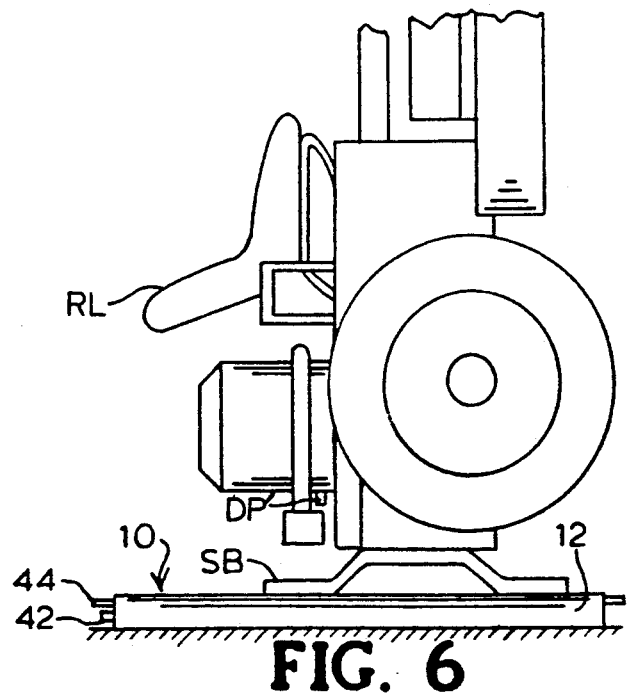
FIG. 6 is a side elevation view of the servicing assembly of the invention showing the rider mower of FIG. 5 tipped ninety degrees and with the rear portion of the rider mower supported on the platform and stabilized by the mower's support brackets.

The lifting and tilting of the front portion of a rear engine mount riding lawn mower RL can be accomplished with moderate effort due to the fact that the engine and the transmission are in the rear, leaving the front relatively light weight. The resultant position for servicing is depicted in FIG. 6, clearly showing the supporting function of support brackets SB. Typical of this design is the Snapper rear engine mount type riding lawn mower, a widely used brand. Each of the support brackets SB rests in this position on a respective stand 14 or 16 with the engine and the drain plug DP' situated immediately above tank pit 30. Optimum positioning of riding lawn mower RL will be with the support brackets SB parallel to and straddling oil tank 40 and resting on the platforms 14, 16 which are dimensioned and spaced apart to facilitate this type of service operation. For the mounting of a riding mower RL, it is not necessary to utilize the ramp 12 discussed earlier. Therefore, an alternate embodiment of the present invention would be a model without such a ramp for use exclusively with riding mowers particularly of the rear engine mount type.

In both the case of the walk-behind lawn mower WL and the riding lawn mower RL, the respective oil drain plug DP or DP' is intended to be loosened when the mower is in an upright position in the case of the walk-behind mower or in a level position in the case of the rider mower and removed for full draining when level in the case of the walk-behind mower or upright in the case of the rider mower. Subsequent to draining the oil from the engine when the mower is in the second position, the respective drain plug DP or DP' is replaced and the mower returned to the first position prior to installing fresh oil through a different opening. It is of course to be understood that oil pan 40 will normally be installed in platform 10 and will normally be empty before an oil draining operation is performed.

Figure 7:
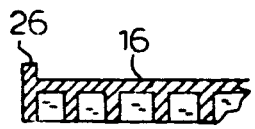
FIG. 7 is a partial section view of a rib reinforced portion of the service platform of the invention as taken along line 7—7 of FIG. 5.

Since the entire weight of the mower WL will be supported on the stands 14, 16, it may be necessary to reinforce and support stands 14, 16. This can best be done with a series of integral ribs 17 and if the platform is to be molded, ribs 17 may also be molded. The degree and style of structural reinforcement below stands 14, 16 will depend on the type and thickness of material of which the service platform 10 is made and the weight of the lawn mowers intended to be serviced. FIG. 7 indicates a general type of rib reinforcement which may be sucessfully employed for the purpose. Both the platform 10 and oil tank 40 may be of plastic molded construction as previously explained.

In FIG. 8 the oil tank 40 is shown in position to be placed into tank pit 30 in the recessed center section of service platform 10. Oil tank 40 is of a size and shape to loosley fit into tank pit 30 with handle notches 32 in a position to receive handles 44 in addition to drain plug notch 34 receiving drain plug pipe 42. Handles 44 extend somewhat beyond the sides 36 of tank pit 30 so as to enable easy installation and removal of oil tank 40. Drain plug pipe 42 includes a removable plug or closure (not shown).

Figure 9:
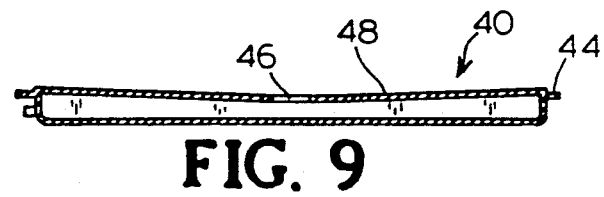
FIG. 9 is a sectional elevation view of the oil collecting tank of the invention as taken along line 9—9 of FIG. 8.

Further detail of oil tank 40 is illustrated in FIG. 9, which shows a section view through the approximate center of the tank. An added feature of oil tank 40 is the configuration in the top wall of the tank of the top surface 48 which slopes from each side or edge of the top wall toward a collecting hole 46 so as to cause the oil which is being drained from the engine of the mower to flow towards the hole and into the tank 40 for safe collection. Hole 46 does not need to be in the center of tank 40, but placement in the center will minimize the amount of pitch required for effective draining and is the style intended in the preferred embodiment.

At the conclusion of collecting the oil from one or more mowers being serviced, a cap 50 is inserted by friction or threaded closure to contain the oil as the tank 40 is lifted. Handles 44 facilitate the step of lifting tank 40 from platform 10 when it is ready to be emptied. When ready to be emptied, the full oil tank 40 is placed in an upright position with oil drain plug pipe 42 in the lowermost point over an oil collecting vat (not shown) and its drain plug is opened to transfer the waste oil into the collecting vat. The collected oil may then be sent for recycling or proper disposal without causing unnecessary environmental contamination.

The drain plug in the drain plug pipe 42 is now closed and the oil tank 40 repositioned in the service platform 10 and the cap 50 removed to ready the tank for additional oil collecting.

Supplemental service tasks done on lawn mowers while in an upright position, such as the removal of the blade and the cleaning beneath the cutting deck are benefitted by the use of the platform of the present invention. These operations and others are not treated in detail as they are commonly understood and performed.

Whereas a particular design has been disclosed as the preferred embodiment of the service platform of the present invention, it should be understood that these concepts are general and broad in nature. It is therefore expressly not offered as a limitation upon the scope of the invention being presented hereby.

What is claimed is:

1. A lawn mower servicing assembly, comprising:
   (a) an integrally formed substantially rectangular platform member having:
      (i) a flat bottom surface suited to resting on a substantially flat ground surface, floor surface or the like;
      (ii) a pair of laterally spaced flat support surfaces extending across the width of said platform member and located above and in a plane parallel to said bottom surface, the dimensions and location of said support surfaces being selected so as to permit each of said support surfaces to act as a stand to support a selected pair of wheels of a walk-behind type lawn mower or alternatively a rear engine mount type riding lawn mower tipped ninety degrees and supported on each of said support surfaces; and
      (iii) between said support surfaces a rectangular recess forming a pit section located below the plane of said support surfaces and suited to loosely receiving a mating oil collecting tank;
   (b) an oil collecting tank dimensioned to be loosely received in said recess to collect oil drained from said mower while resting on said platform;
   (c) at one end of and extending widthwise of said platform member and formed integral therewith a ramp section providing an upwardly inclined entry surface for the wheels of a walk-behind type lawn mower to be serviced on said platform member; and
   (d) a pair of upwardly projecting vertical stop surfaces located at outer side extremities of each of said support surfaces and suited to serving as stops for the wheels of a walk-behind type lawn mower.

2. A lawn mower servicing assembly as claimed in claim 1 including an elongated bar member pivotally joined at one end to said platform member and operable as a lift bar to support a walk-behind type lawn mower in an upright position to enable work to be performed on the underportions thereof.

3. A lawn mower servicing assembly as claimed in claim 1 wherein said oil collecting tank includes:

(a) a rectangular top wall having a top surface which slopes downwardly from each of its sides to a collecting aperture formed in and centrally of said top surface;

(b) a cap member removably secured in said aperture; and (c) an outwardly extending drain member having a removable closure and forming a passage for draining oil collected in said tank, said platform member recess being formed so as to accommodate said drain member extending outwardly from said recess.

4. A lawn mower servicing assembly as claimed in claim 2 wherein said oil collecting tank includes:

(a) a rectangular top wall having a top surface which slopes downwardly from each of its sides to a collecting aperture formed in and centrally of said top surface;

(b) a cap member removably secured in said aperture; and (c) an outwardly extending drain member having a removable closure and forming a passage for draining oil collected in said tank, said platform member recess being formed so as to accommodate said drain member extending outwardly from said recess.

5. A lawn mower servicing assembly, comprising:
(a) an integrally formed substantially rectangular platform member having:
  (i) a flat bottom surface suited to resting on a substantially flat ground surface, floor surface or the like;
  (ii) a pair of laterally spaced flat support surfaces extending across the width of said platform and located above and in a plane parallel to said bottom surface, the dimensions and location of said support surfaces being selected so as to permit each of said support surfaces to act as a stand to support a selected pair of wheels of a walk-behind type lawn mower or alternatively a rear engine mount type riding lawn mower tipped ninety degrees and supported on each of said support surfaces; and
  (iii) between said support surfaces a rectangular recess forming a pit section located below the plane of said support surfaces and suited to loosely receiving a mating oil collecting tank; and
(b) an oil collecting tank dimensioned to be loosely received in said recess to collect oil drained from said mower while resting on said platform; and
(c) an elongated bar member pivotally joined at one end to said platform and operable as a lift bar to support a walk-behind type lawn mower in an upright position to enable work to be performed on the underportions thereof.

6. A lawn mower servicing assembly, comprising:
(a) an integrally formed substantially rectangular platform member having:
  (i) a flat bottom surface suited to resting on a substantially flat ground surface, floor surface or the like;
  (ii) a pair of laterally spaced flat support surfaces extending across the width of said platform and located above and in a plane parallel to said bottom surface, the dimensions and location of said support surfaces being selected so as to permit each of said support surfaces to act as a stand to support a selected pair of wheels of a walk-behind type lawn mower or alternatively a rear engine mount type riding lawn mower tipped ninety degrees and supported on each of said support surfaces; and
  (iii) between said support surfaces a rectangular recess forming a pit section located below the plane of said support surfaces and suited to loosely receiving a mating oil collecting tank; and
(b) an oil collecting tank dimensioned to be loosely received in said recess to collect oil drained from said mower while resting on said platform; and
(c) a rectangular top wall having a top surface which slopes downwardly from each of its sides to a collecting aperture formed in and centrally of said top surface;
(d) a cap member removably secured in said aperture; and
(e) an outwardly extending drain member having a removable closure and forming a passage for draining oil collected in said tank, said platform member recess being formed so as to accommodate said drain member extending outwardly from said recess.

7. A lawn mower servicing assembly as claimed in claim 5, further comprising:
(a) a rectangular top wall having a top surface which slopes downwardly from each of its sides to a collecting aperture formed in and centrally of said top surface;
(b) a cap member removably secured in said aperture; and
(c) an outwardly extending drain member having a removable closure and forming a passage for draining oil collected in said tank, said platform member recess being formed so as to accommodate said drain member extending outwardly from said recess.

* * * * *